(12) United States Patent
Samaan et al.

(10) Patent No.: US 10,154,102 B2
(45) Date of Patent: Dec. 11, 2018

(54) SYSTEM AND METHOD FOR CLOUD COMPUTING ON-DEMAND DYNAMIC SERVICE MANAGEMENT ENGINE

(71) Applicant: Tize Technologies Inc. (AccompliceTM) C/O WeWork, New York, NY (US)

(72) Inventors: Hani Samaan, West New York, NJ (US); Allison E Boucher, Astoria, NY (US)

(73) Assignee: Tize Technologies Inc., New York, NY (US)

( * ) Notice: Subject to any disclaimer, the term of this patent is extended or adjusted under 35 U.S.C. 154(b) by 107 days.

(21) Appl. No.: 15/492,806

(22) Filed: Apr. 20, 2017

(65) Prior Publication Data
US 2017/0310770 A1   Oct. 26, 2017

Related U.S. Application Data

(60) Provisional application No. 62/325,180, filed on Apr. 20, 2016.

(51) Int. Cl.
*G06F 15/173* (2006.01)
*H04L 29/08* (2006.01)
(Continued)

(52) U.S. Cl.
CPC ............ *H04L 67/20* (2013.01); *H04L 45/306* (2013.01); *H04L 67/327* (2013.01); *H04W 4/50* (2018.02);
(Continued)

(58) Field of Classification Search
CPC .............. G06Q 10/0631; H04L 45/306; H04L 67/1004; H04L 67/20; H04L 67/32; H04L 67/327; H04W 4/50
(Continued)

(56) References Cited

U.S. PATENT DOCUMENTS

| 8,819,207 B2* | 8/2014 | Ravichandran | G06Q 10/06 705/2 |
| 8,954,564 B2* | 2/2015 | Ferris | G06F 9/5072 709/223 |

(Continued)

OTHER PUBLICATIONS

International Search Report dated Oct. 12, 2017.

*Primary Examiner* — Phuoc H Nguyen
(74) *Attorney, Agent, or Firm* — Sofer & Haroun, LLP

(57) ABSTRACT

The present arrangement is a system for connecting consumers with services. The system has a mobile application management platform for supporting connection with a plurality of third party service providers. A display module provides an interface for displaying interaction with the third party service providers in an integrated arrangement. The consumer requests at least two services offered by a plurality of the mobile application platforms of the third party service providers. A processor parses the service request and assembles at least one combination of at least the two services, based on a coordination of an optimized combination of the two services based on time and cost so as to allow the consumer to select and initiate a corresponding request for the combination to at least said two services. A fulfillment module configured to complete ordering of the transaction with both the consumer, the fulfillment module sending service request to the third party service providers, based on information received from the scheduling unit regarding the completion time of each service while each service is being performed.

1 Claim, 11 Drawing Sheets

Figure 1:
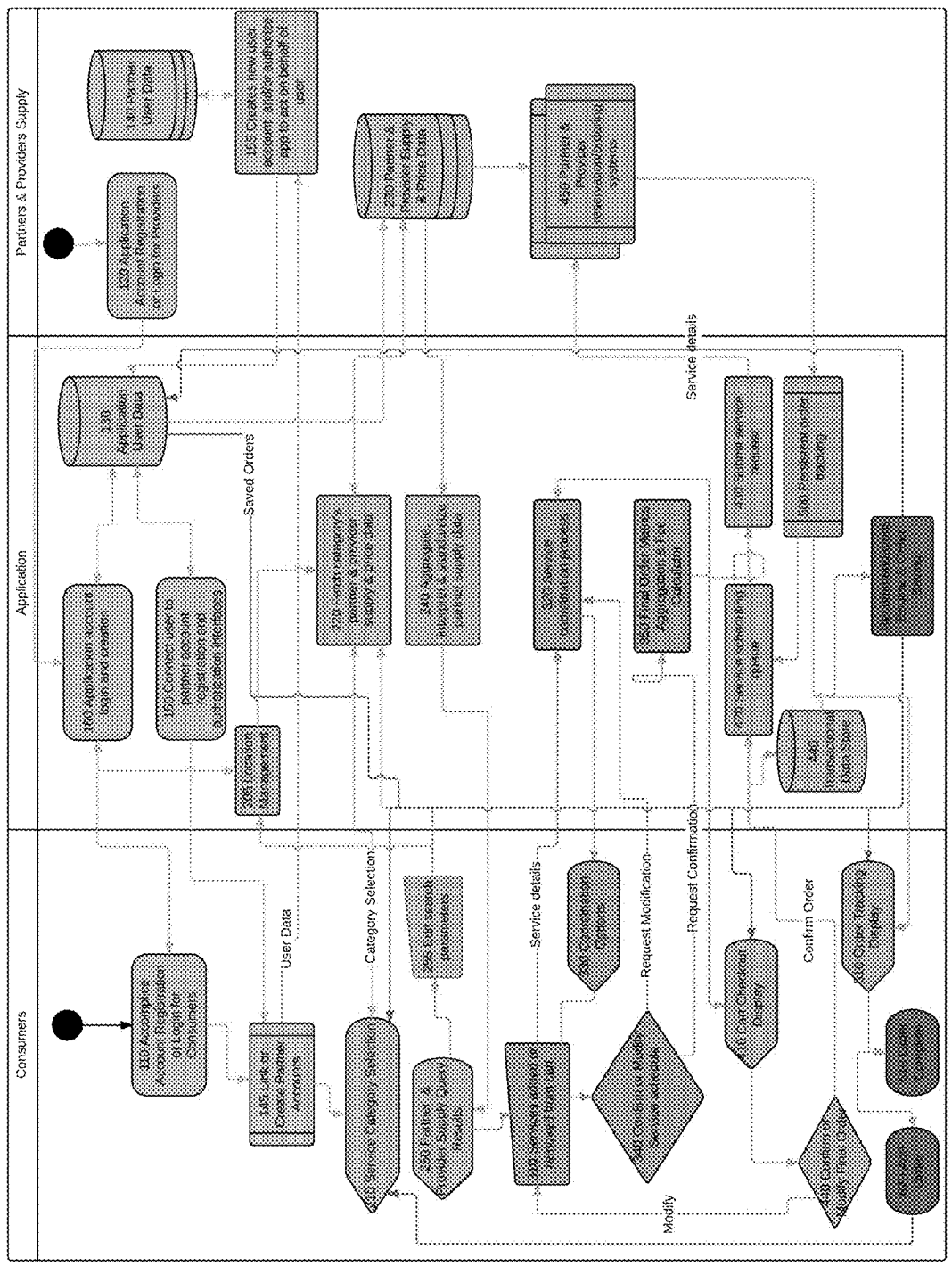

(51) Int. Cl.
*H04L 12/725* (2013.01)
*H04W 4/50* (2018.01)
*G06Q 10/06* (2012.01)

(52) U.S. Cl.
CPC ...... *G06Q 10/0631* (2013.01); *H04L 67/1004* (2013.01); *H04L 67/32* (2013.01)

(58) Field of Classification Search
USPC .......................................... 709/225, 227–229
See application file for complete search history.

(56) References Cited

U.S. PATENT DOCUMENTS

2011/0112866 A1   5/2011   Gerrans
2015/0142497 A1   5/2015   Osumi et al.

\* cited by examiner

Page 1   Page 2   Page 3

Page 4   Page 5   Page 6

Page 1　　　　　　　　Page 2

Page 1    Page 2    Page 3

Page 4    Page 5

SYSTEM AND METHOD FOR CLOUD COMPUTING ON-DEMAND DYNAMIC SERVICE MANAGEMENT ENGINE

RELATED APPLICATION

This application is related to and claims the benefit of priority from U.S. Provisional Patent Application No. 62/325,180, filed on Apr. 20, 2016, the entirety of which is incorporated by reference.

BACKGROUND

Field of the Invention

This application relates to a service management engine that integrates two or more service applications.

Background and Description of Related Art

During the last decade or so, the services industry has experienced the emergence of On Demand and Sharing Economy Platform Businesses that disrupted many traditional/decades old (now legacy) business models in the Taxi, Hotel and Food/Goods delivery industries to name a few. These platforms have revolutionized their industries of focus forever by turning a once stagnant asset (e.g. Car or Home) into a revenue-generating asset. Assets and their owners combined are now service providers who answer to consumers on-demand needs at relatively, in some cases significantly, lower cost than the legacy competition. The often-mobile based platforms have become the middle man bringing consumers and providers closer together with as little friction as possible to significantly enhance the transaction experience.

OBJECTS AND SUMMARY

Though it seems like significant breakthroughs have been achieved, there is still a lot of leaping forward to do. Every and each one of these platforms is single industry focused and naturally operate in silos as they are all individual companies thus no synergies can be achieved to accommodate our everyday compounded/complex transactions. Consumer are still parsing out their needs as they have done for many years and utilizing new technologies and business models to accommodate those needs.

The present arrangement provides a Cloud Computing On-Demand Service Management Engine that is a flexible and agile platform where consumers, providers, partners and assets are combined to empower consumers to price compare and generate endless combinations of services. The services are configurable/customizable at the request point to produce combinations of service currently impossible or very difficult to achieve/coordinate on the existing platforms. The present platform also provides consumers with suggested execution plan options (lowest cost vs. fastest time) for their compounded transactions based on service legs logical execution order and provider choice using our proprietary synergy logic.

The present arrangement provides for a system for connecting consumers with services. The system has a mobile application management platform for supporting connection with a plurality of third party service providers each of which providing a service through a corresponding mobile application platform.

The mobile application management platform includes a display module for providing an interface for displaying interaction with the third party service providers in an integrated arrangement, the interactive display configured to be viewed on an electronic device of a consumer, allowing the consumer to select and order a plurality of selectable services offered by the third party service providers without interacting directly with the third party mobile application platforms.

The display module is configured to receive from the consumer a request for at least two services offered by a plurality of the mobile application platforms of the third party service providers, the request transmitted to the system. A database aggregation unit is configured to receive and store data from a plurality of third party service provider databases each of the third party service provider databases contain data sufficient to perform services for a corresponding third party mobile application platform.

A processor is configured to parse said service request for at least said two services from the consumer based on data stored in the database aggregation unit, the processor assembling at least one combination of at least the two services, based on a coordination of an optimized combination of said two services based on time and cost so as to allow the consumer to select and initiate a corresponding request for the combination to at least said two services.

A scheduling unit is configured to monitor the time of completion of each one of the selected services. A fulfillment module configured to complete ordering of the transaction with both the consumer, the fulfillment module sending service request to the third party service providers, based on information received from the scheduling unit regarding the completion time of each service while each service is being performed.

BRIEF DRAWING DESCRIPTION

Figure 2:
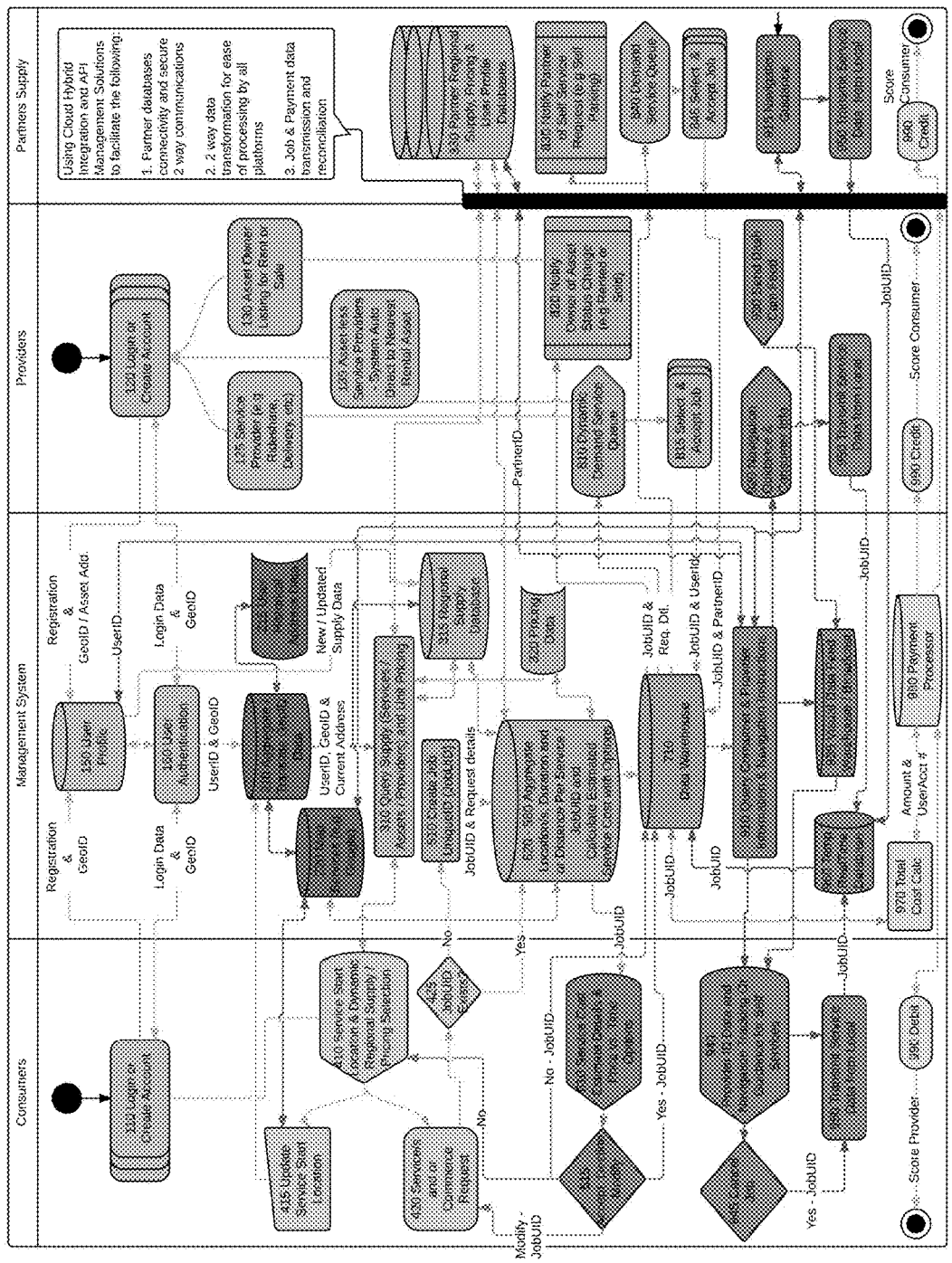
Figure 3:
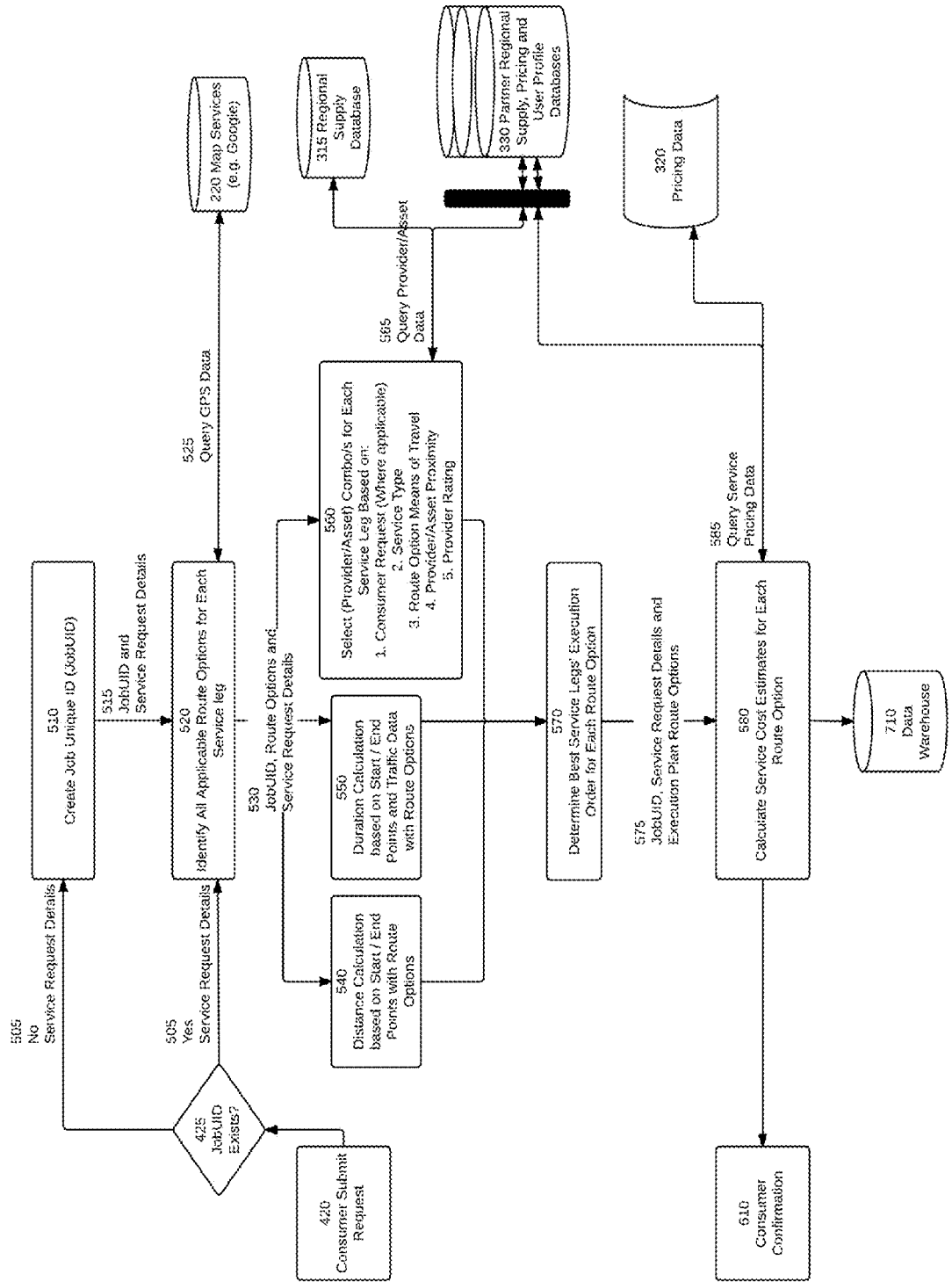

The present invention can be best understood through the following description and accompanying drawings, wherein:

FIG. 1 is a full view and layout of the cloud based management engine and its various components with functional flow interconnect lines displaying complete implementation concept(s), methodology and transaction lifecycle, in accordance with one embodiment;

FIG. 2 is a detailed module diagram and flow chart of an exemplary implementation of the cloud based management engine, also displaying the end-to-end implementation concept, methodology, and transaction lifecycle, in accordance with one embodiment; and FIG. 3 is a detailed view of the "500s—Services request aggregation, execution ordering, cost estimation and full route cost options management" component/function from FIG. 2.

FIGS. 4A-4H includes screen images of user-facing displays presented by the system and its various components, in accordance with several embodiments.

DETAILED DESCRIPTION

The following descriptions are considered exemplary embodiments and are not intended to limit the scope of the invention. Other embodiments of similar effect structure and methodology are also within the contemplation of the present invention.

The present arrangement, as indicated above in the summary provides a Cloud Computing On-Demand Service Management Engine that includes a flexible and agile platform where consumers, providers, partners and assets are combined to empower consumers to price compare and generate endless combinations of services. Consumers are the everyday network plurality of users who initiate service requests and demand. Providers are the everyday network plurality of users who provide services or assets to satisfy consumer demand. Partners Supply is the everyday plurality of providers, services and assets offered by each partner our network has an affiliation agreement with. Management System is the axial core of the service management engine that coordinates between the previous 3 pillars to bring a dynamic on-demand supply/demand network to all users.

In this context, consumers are end users of the system that are seeking to use one or more services offered through the system. An example would be a user seeking a ride service to a destination. The providers are also individual users of the system but they additionally provide one of the offered services. An example would be an Uber™ or Lyft™ driver. Partner Supply would also be entities providing a service offered to the users of the system. Unlike, providers, partner supply would refer to business supplier of the service such as the Uber™ or Lyft™ service itself.

In one embodiment of the present arrangement, the below described management system offers users the ability to connect to the providers and Partner Suppliers not only to seek one particular service (offered by a plurality of providers and partner suppliers) but to seek a combination of two or more services to be combined into a completed work order (each service being offered by a plurality of providers and partner suppliers). The following description explains the architecture and process of the management system, its relationship with respect to the consumers, providers and partner suppliers, and how it operates in conjunction with these entities to connect the consumers to the desired providers and partner suppliers.

FIG. 1 broadly illustrates an overall concept of the dynamic service management engine's architecture and framework in accordance with one embodiment. The architecture provides users with leverage solutions including, but not limited to, mobile hub, big data, API management, machine learning and cloud hybrid integration, allowing the users to manage all functions and support a flexible framework. The engine's functions are spread across 4 pillars (Consumers, Management System, Providers and Partners Supply).

A detailed implementation example of one embodiment of the invention is illustrated in FIGS. 2 and 3, including the same core management system components across the 4 pillars mentioned above.

Figure 4A:
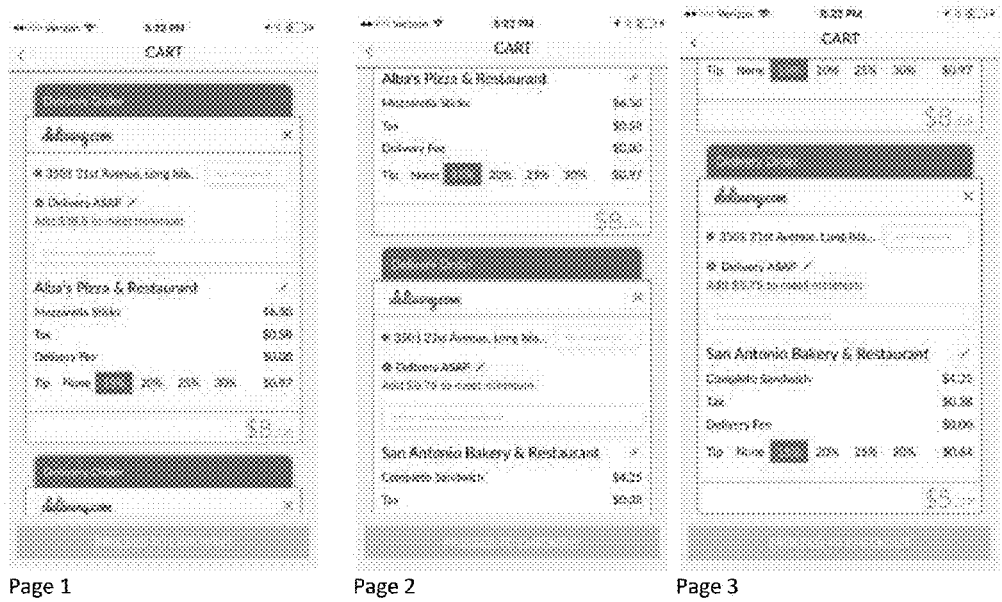

FIG. 4A is screen image of a cart showing checkout from 2 merchants. User scrolls down the page to view each order. These images represent the same screen, with the second and third screen showing the rest of the view as the user scrolls.

Figure 4B:
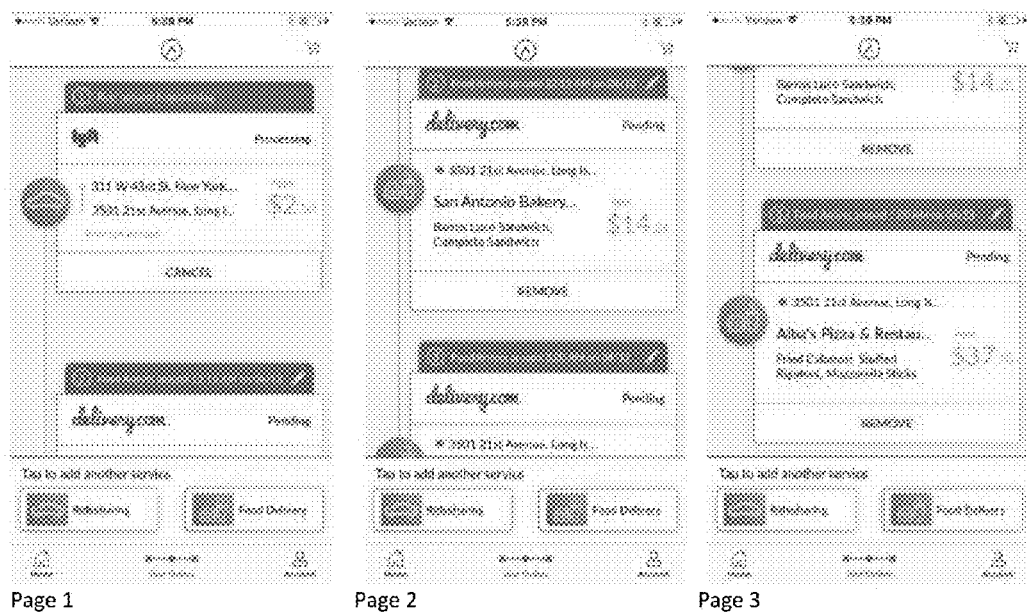

FIG. 4B: is a screen image of a tracking display, showing orders from differing service verticals (ride and food) on the same display. The user scrolls down the page to view each order. These images represent the same screen, with the second and third screen showing the rest of the view as the user scrolls.

Figure 4C:
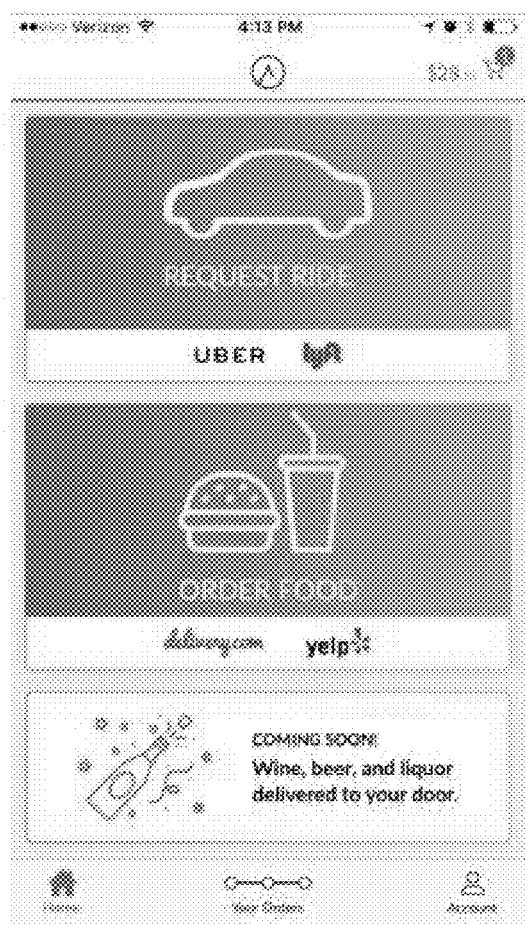

FIG. 4C: is a screen image that illustrates the service category display, where users can choose from multiple service categories to order from, contained within a single display.

Figure 4D:
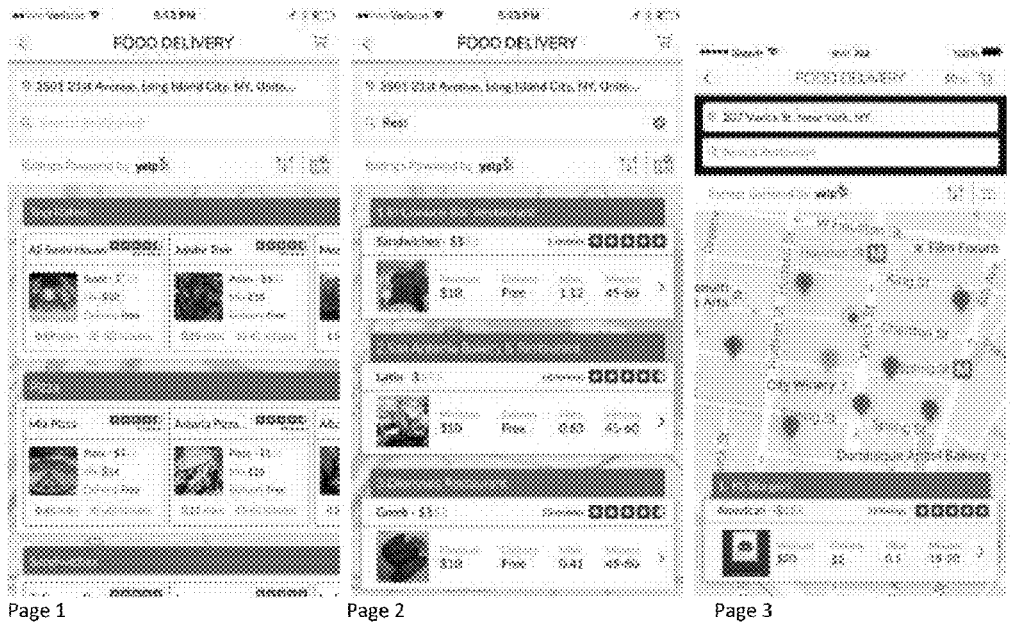
Figure 4D:
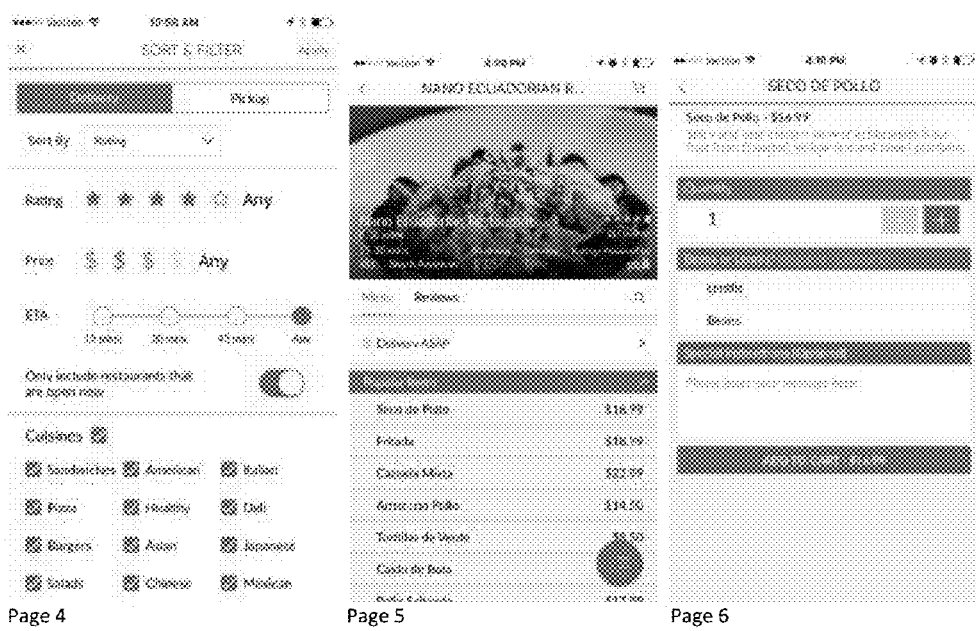

FIG. 4D: is a screen image illustration of display of food delivery category supply to the user. Page 1 is an example of display of merchants by cuisine, with an example of Keyword search display on page 2 and sort and filter controls on page 4. An alternate display (map view) is illustrated on page 3. Page 5 shows an example of a single merchant's supply, while page 6 includes a single menu item display from that merchant.

Figure 4E:
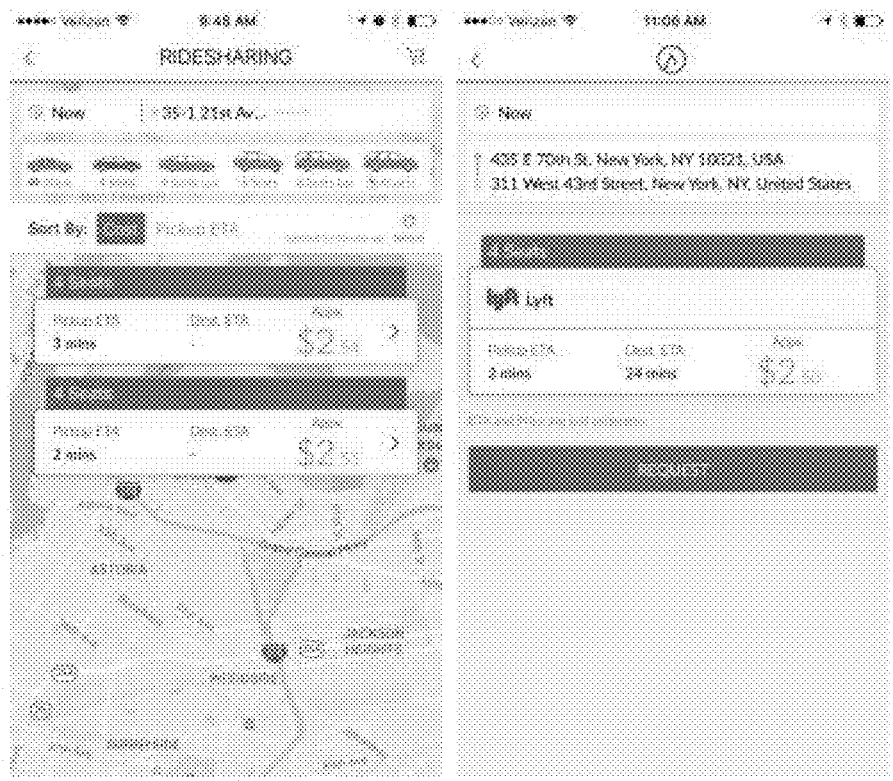

FIG. 4E: is a screen image example of display of rideshare category supplied to the user for search and filter in screen 1. Screen 2 shows the ride request display.

Figure 4F:
Figure 4F:
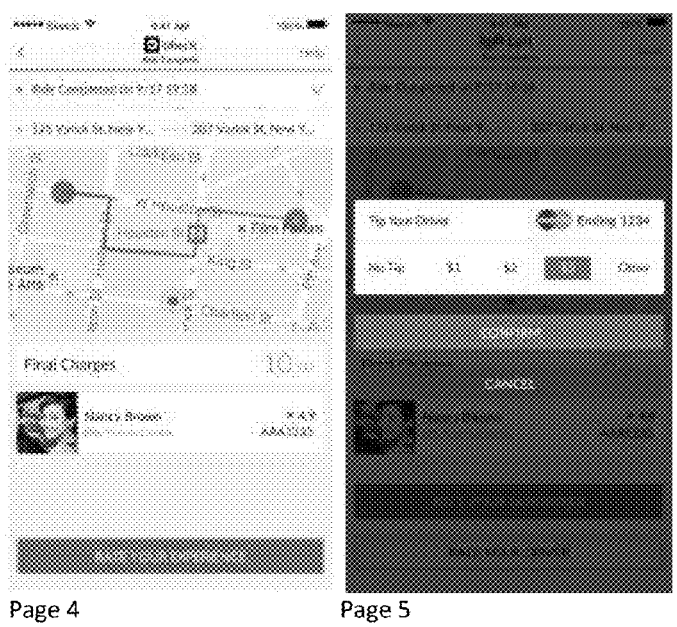

FIG. 4F: is a screen image Example of a service tracking display, shown here for rides. The display is updated for each ride status. Page 1 reflects a ride that has been requested, with a recommended service combination. Pages 2 through 4 reflect rides as they progress through each status—Accepted, in Progress, Complete. Page 5 shows a ride tipping and rating input upon ride completion.

Figure 4G:
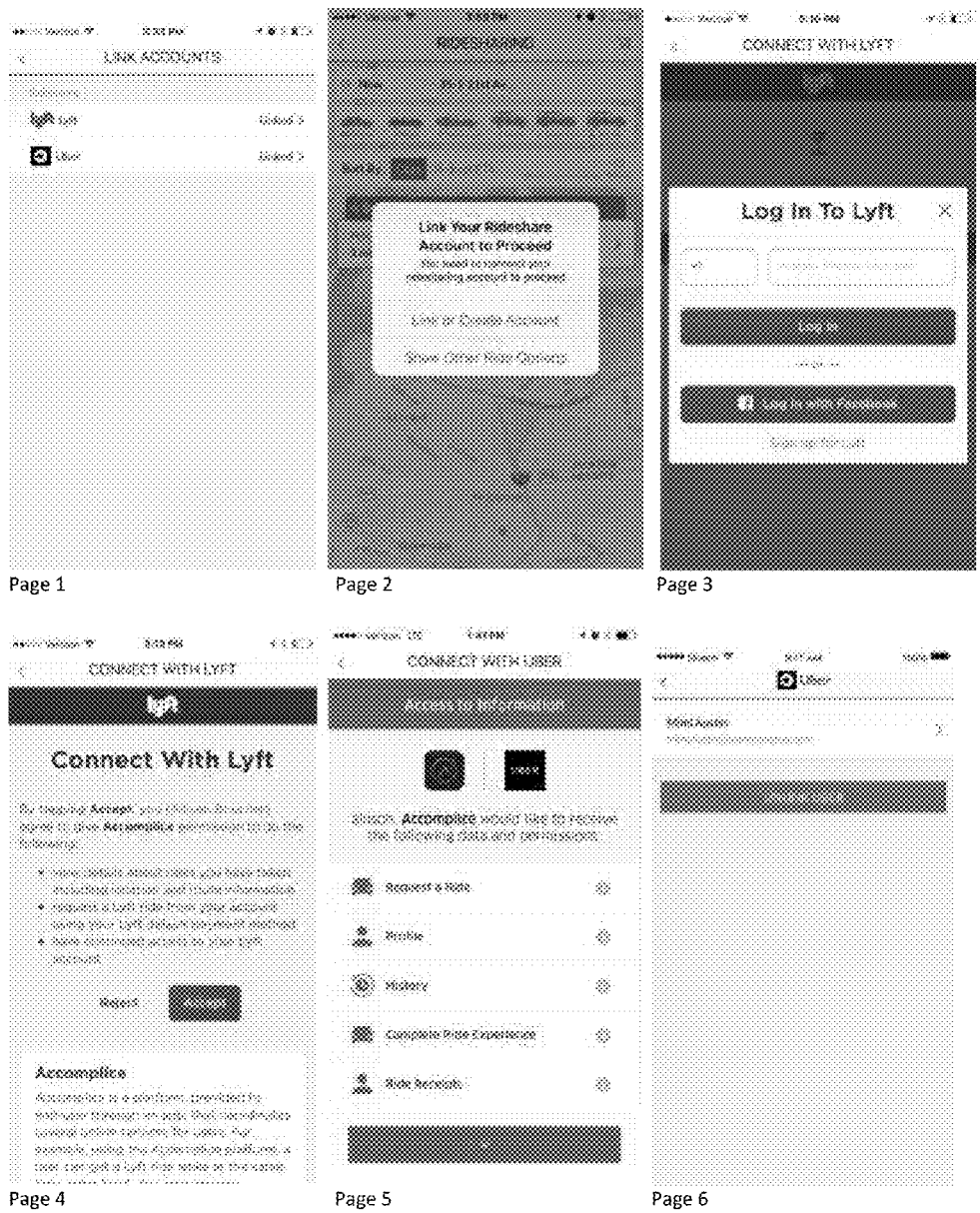

FIG. 4G: is a screen image that illustrates account linking functions between Accomplice and partner accounts. Page 1 shows access to account linking functions from a user's Accomplice account page, while Page 2 shows access directly from a search function. Pages 3 and 4 show the login and authorization functions, via in-app browser, for 1 partners. Page 5 is another example of the same authorization function for an alternative partner. An un-linking option is shown on Page 6.

Figure 4H:
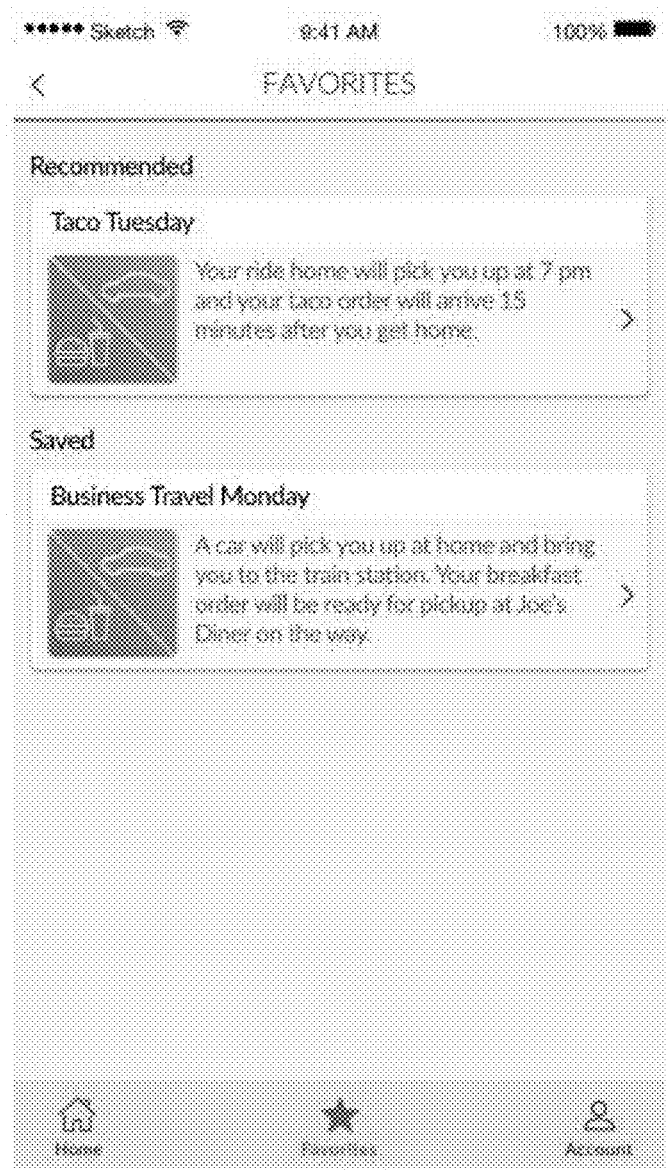

FIG. 4H: is a screen image example of display of recommended and saved combinations of services. Users may select these combinations to order pre-set bundles of services.

In the following example illustrated in FIG. 1 the various "blocks" refer to related steps and the associated system modules integrating across consumers, management systems, providers and partners/supply as shown in FIG. 1 in the three columns. A "block" may be related actions and associated underlying system tools across all three columns, but are more precisely defined using the specific step numbers as shown in FIG. 1.

Block 100 (User login and registration steps and modules) demonstrates, in accordance with one embodiment, consumers 110 and providers 120 logging in or creating a new account (for new first time users) by entering their login information or completing the new user registration forms. All user data is submitted and saved in the application's user data store.

Providers may be attributed to categories including but not limited to service providers, asset owners, and/or assetless service providers. A single provider can be attributed to a single, multiple or all depending on their offerings.

For New Users (consumer and provider):
1. All users (110 and 120) register for an account the first time they use the application, and log in using their account credentials each time thereafter. Registration may also be performed through connection with social media accounts, and may be verified using text message verification or other 2-factor options. The application creates an account 160 using the data submitted in the registration form and the data is stored for future use 130.
2. The application provides the user with forms allowing them to link their application accounts with their partner accounts 150, where supported by the partner. The user may choose to link their accounts 145 or may proceed to the next step. If the user chooses to link their account, the application facilitates connection with partner registration and account registration forms, and the partner performs authorization or new user creation processes 155 using their user data 140. Then this link is maintained within the user's application account data 130 for each future use, so the user only needs to perform the account linking one time. An illustration of the application's displays shown to users to facilitate this linking, according to one embodiment, is included in FIG. 4G.

In this step, the user may also create new accounts with partners and link the new account. The system stores a record of new account creations in its transaction and account tracking module for analysis and tracking of user activity and revenues.

3. Provider service metrics are provided upon registration 120 and stored with the application's user data 130. Metrics and location data required for supply management are sent to the next step Block 200 to make the information available to consumers.

Block 200 (Search engine) demonstrates, in accordance with one embodiment, how the management system uses the plurality of provider's user and location data received from the prior process step to create and maintain provider supply, (services, assets for rent or sale and providers) availability, obtain partner supply data, and display the supply and price data to the user.

Location Management 205—First, the management system identifies the Consumer's location using the location utility on the user's mobile device. The Consumer may also search for locations and save them for future use. The system uses third party location services (like Google Maps or Places APIs) to allow the user to search for locations, then stores the locations in the user's profile where they can be retrieved for subsequent searches.

Provider supply is received from the application user data 130 and actively updated in the provider supply data store 230. Location data required for search functions is updated based on the type of provider:

1. For mobile providers (e.g. drivers who are constantly on the move)—
   Identify the providers geographic location and poll several times per minute to monitor movement, then
   Update the provider identification and location data in the provider supply database for accurate supply positioning.
2. For all other suppliers and assets that are static (e.g. Car listed for rent and its owner)—static physical addresses captured during the registration process 120 and stored with the user data 130, which then is sent to update the partner supply data 230.

Partner supply data 230 is obtained through connections established via partner technologies (eg, APIs, webhooks, deeplinks) or cloud hybrid integration solutions.

In sub process 220 the system fetches the available service categories from the Partner & Provider Supply data 230 that are within range of the Consumer's location. The available service category data is gathered from 230 and is then aggregated for display for the consumer to navigate through (display 210). An illustration of this display, according to one embodiment, is include in FIG. 4C. The user selects the service they are interested in. The application then requests all available supply data servicing the user's location from partners and network providers within the category specified 220 and presents the results of the search to the user 250. The search results may include various parameters relevant to the category, such as availability by product type, pricing, and proximity of results. Obtaining the data from our partners is established via partners' API technology or cloud hybrid integration solutions.

The consumer then can utilize advanced filtering 255 to navigate through the supply data presented to zone in on services or assets desired (sub process 415). In this step, the user may change the location pertinent to their query by searching for a new address, facilitated through communication with third party location providers (like Google Maps API) (sub process 205), or selecting from a previously used or saved address (data store 130). The engine may use the other services the user has in progress to identify locations relevant to the Consumer's service of interest. The engine will then refresh the supply display 250 based on the refreshed query. Illustrations of these supply displays, according to one embodiment, are included in FIG. 4D-4F.

In one example, in the food delivery category, the system displays merchants sorted by cuisine. The system presents the Consumer a list of cuisines available in the Consumer's location, and within each cuisine, the available merchants are listed. The cuisines are ordered by the number of merchants available within them, with cuisines with the greatest number of merchants appearing first. The merchants within each cuisine are displayed next to each other in a horizontal row, and the user can scroll through to discover merchants of interest. The user taps the merchant to view their menu and identify items to add their cart 310. An illustration of this display, according to one embodiment, is included in FIG. 4D—Page 1.

When the consumer has completed their query, they may then select one or more service results and add them to their cart 310. The consumer may perform multiple searches, from one or more service categories, and add many results to the cart before checkout. This may include results from more than one partner or merchant depending on the consumer's preferences.

Block 300 (Coordination Engine) demonstrates, in accordance with one embodiment, how the management system uses the job request data gathered from the previous process to aggregate, schedule, and coordinate the services within the request, and compile service fee pricing details.

Once data is received then the coordination algorithm for each service leg performs the following steps:

1. Parse and transform these metrics for each service:
   a. Service start and end points, based on the location specified in the Consumer's query in Block 200
   b. Service schedule (customer preference if applicable)
2. For all services requiring provider mobility from point A to point B and priced based on duration or distance, query a third party map or GPS services provider using each service leg's start and end addresses 525. The goal is to obtain all distance and duration metrics. Then send all relevant service details to the application's service coordination process 320.

The service coordination process 320 then evaluates the service metrics and establishes coordination and scheduling options:

1. Now: Initiate the service request immediately upon checkout (i.e. order now)
2. Dependent on other services: Schedule the service request to be initiated when criteria dependent on other services are met (e.g. wait for the first service to complete then deliver the second service). The process will obtain data on other services in progress or queued from the service scheduling queue 420
3. In the future: schedule the service to occur at a date and time in the future specified by the consumer
4. Aggregate services to be executed by the same provider (e.g. Valet and Gas Up or Ride Share and Food Delivery)

In some cases, to assess the above decisions appropriately the engine may seek user confirmation to configure the dependency.

By default, the coordination process will suggest the schedule most likely to meet the user's needs. This scheduling algorithm may predict the best schedule and coordination of services using the type of service ordered (as described above in block 200), characteristics of other services already in process or scheduled, locations of this service and other scheduled services involved (also obtained in block 200 above), and additional parameters unique to the user history and request details. For example, if a user orders a ride and then adds food delivery to their order, and uses the same location for both services, the process may assume that the consumer wants food delivered to their destination after they complete their ride there.

Once the engine has identified the suggested schedule, the consumer is presented with coordination options 330 has the option to modify or accept the suggested schedule 340.

Then the application sends the service execution details to the Service Fee calculator 350, then it is presented to the consumer displaying service details (e.g. cost and execution time) for updates (if any) and final confirmation 410.

Block 400 (request engine) (back to FIG. 1) demonstrates, in accordance with one embodiment, how the consumer finalizes their order and the application executes the service request.

Aggregated service details, including service schedule and service fees, are received from the service coordination process in block 300, and presented to the consumer in the cart checkout display 410. The cart checkout display includes details of all services or items the Consumer has selected for Checkout. This may include orders from multiple Providers, Partners, and/or Partner merchants, all included in the same display. An illustration of such a display, according to one embodiment, is included in FIG. 4A.

The consumer can navigate between the presented options' details and make modifications 440:
1. Remove the service—Modifies the user's cart so the previously selected service is eliminated and re-triggers the coordination process 310.
2. Modify service request—The user may edit their scheduling options or change the quantity or other aspects of their order. This is performed in the same display as the cart, and again triggers the coordination process 310.
3. Confirm the service request—this submits the customer's order details to the scheduling queue 420 for further processing in the next steps.

When the user confirms the service request, the application interacts with the network providers and partners via the management system dispatch engine to perform a multitude of operations inclusive of the following steps 1-3:
1. Dispatch appropriate message, notifications or actual job orders to network and partner providers' reservation systems 430,
2. Initiate navigation instructions guidance and tracking for consumers and providers
3. Request and receive final total trip cost and process payment debits and credits In step 1 of the application interacting with the network providers and partners, the service request details are dispatched accordingly based on the service type, schedule option, and whether the provider is a network provider or partner affiliate.

Network providers have access to a dynamic service demand queue that the management engine utilizes to dispatch services requested by consumers. The queue displays services organized by service type and proximity, and filters by provider/asset type combo and provider's reputation scoring.

The following depicts how dispatching and notification is handled for each service leg:
a. If services are provided by a provider who uses their asset to provide a service (such as ride share drivers) then place the service request details in the dynamic demand queue, else
b. If services are provided by a provider who is making their asset available to the user, then dispatch a notification to the provider's device advising asset status change 730 (rented or sold), display consumers info and any further instructions as applicable, else
c. If services are provided by a partner service provider and are self-service in nature (e.g. renting a parking spot) then send the partner a notification advising the asset status change 740, display consumer info and any further instructions as applicable, else
d. If services are provided by a partner service provider and are not self-service in nature (eg, have groceries delivered), send service request details to the partner's designated service demand queue 450.

The timing of the service request dispatch must take into the fact that many network providers and partner service providers do not support scheduling of future requests (ie, they only accept on-demand requests). To accommodate this, send the service request 430 only when the time of the initiation of the service request is estimated to meet the consumer's schedule preferences. For example, if the service is scheduled to occur right away, send the service request details to the partner immediately. If it's scheduled to occur in the future, then send the request details only at the designated time in the future.

If the job is scheduled dependent on other services, the time when it is dispatched may be impacted by the tracking details received by the engine (described in block 500 below). The process listens to these tracking details to identify changes in timing of dependent services, and adjusts the timing of the subsequently scheduled service as needed. For example, if food is scheduled to delivered after a ride completes, and traffic delays cause the ride completion time to be delayed beyond the initial estimates, then the dispatch of the food request to the partner provider is delayed accordingly.

In step 2 of the application interacting with the network providers and partners, the job request details and provider details are sent to the next process step for further processing.

In step 3 of the application interacting with the network providers and partners, the job request details, consumer details, and provider details are sent to the next process step for further processing.

All job details as described above are also submitted to the system's transactional data store 440, where they are used for analysis and creation of order recommendations as described in block 600 below.

Block 500 demonstrates how the management system receives its job request data after confirmation of consumer need and provider availability to execute a service to then distribute each user's information to the other party as well as handing out navigation instructions and tracking capabilities to guide the Job requested through completion and display Job details to the user. The sub process receives its first set of data from the reservation system 450 including job request details, and provider details. Then communicates with a third party map and GPS services provider, the partners' navigation guidance instructions sent by the partner to their provider to guide him or her through the job, the network's user profile data warehouse 130 and the partners' user data 140 to gather navigation instructions and consumer/provider user information which are then distributed to the various users involved with a service in progress. Those communication details are as follows:
1. Use the service's start and end addresses (obtained from prior process steps) as query parameters to receive the detailed step-by-step navigation instructions for guidance and tracking purposes.
2. Use the job data, provider data, and services start and end addresses (as necessary) as query parameters to receive the detailed step-by-step navigation instructions.
3. Use the consumer or the network provider data as query parameters to obtain the detailed user information such as (but not limited to) full name, phone number, picture and asset description.
4. Use the partner identifier as a query parameter to obtain same details like the previous step Then, once all data has been collected, the providers receive the navigational instructions from start to end points of each service leg as well as the consumer's name and contact information. For select services (e.g. Ride Share) the provider might be equipped with a dash cam, which will capture a real time video stream of the street view from the provider's car that is then sent to the management system's visual data feed warehouse and broadcaster. The feed is enhanced by overlaying the navigation instructions, which are being sent to the driver in real time for guidance.

The consumer then receives navigation and provider information, all within the tracking display 510, as follows:
1. For "self service" services (e.g. self parking) the consumer will receive navigation instructions to guide him or her to the parking lot facility.
2. For services provided by a network provider or a partner service provider the consumer will receive:
    a. The provider's name, picture, Asset description and contact information.
    b. Navigation tracking information to monitor service progress and provider location. In cases where the network provider is dash cam equipped, the consumer receives the enhanced dash cam feed broadcasted from sub process.
    c. Count down in minutes and miles to service completion.

An illustration of this tracking display for a ride service, according to one embodiment, is included in FIGS. 4E and 4F.

If the user has checked out multiple services, either in a single checkout request or multiple iterative requests as described in block 600 below, details for all of the services in progress or scheduled are displayed in same tracking display 510. This display is illustrated in FIG. 4B.

If the user requires support or needs to communicate with the provider for any service, for example if they need to call the driver if rideshare is provided, the application provides the user with options to contact the service provider. In certain situations the Provider's phone number is displayed in the tracking display 510, with buttons to call or text the driver. If the Consumer taps the buttons, the phone's dialer or text message application is opened. If the Consumer cancels the call or text, or when they have completed the call or text, the system automatically directs the Consumer back into the tracking display in the application. The tracking display also includes a link for Help. In the case that the service is provided by a Partner provider, the Help link opens the Partner's help page within an in-app browser directly in the application, so the Consumer does not need to leave the application environment to get help.

In some situations a consumer may decide to cancel a service that is in progress (e.g. cancel a food delivery, cancel a ride share pickup, etc.) those cancelation commands are first initiated by the consumer in the order tracking display 510 which sends the JobUID and a cancelation notification to the next process step to log the cancellation request. All parties involved in an on-going transaction must transmit real time transaction progress data via their local devices back to the management engine for temporary storage and processing. The data transmitted includes (but not limited to) service request data, account numbers, changes in execution plan route option, changes in service duration or distance for example due to additional stops, service cancelations and service completion.

Block 600: Order Iterations demonstrates how the system provides the users with access to order iterations and shortcuts to saved and/or recommended orders.

From the tracking display 510, the user experience may be complete for this session 610, or the user may choose to add more services 620. If the user chooses to add more services, the system returns the user to the search display 210 and from there the user may choose more services to add to their itinerary, from which point the process continues as described above. The user may also save their order details for future use 630. The system posts the saved orders in the user profile 130. If the user accesses the saved order in a future session, the system populates the user cart display 310 with the saved order details and the process begins again from block 300. Saved orders may include single or multiple Providers, Partners, and/or Partner merchants. For example, a saved order may consist of a ride from a network provider, pizza delivery from a pizzeria listed by a Partner like Delivery.com, and dessert delivery from a bakery listed by a Partner like Delivery.com. The saved orders are as detailed as the user specifies. In the example above, the pizza delivery might include details like the exact menu items such as a large cheese pizza and a bottle of soda, plus a specification that the food arrive after the ride, and the ride begins at 6 pm. An illustration of the application's display of saved orders, according to one embodiment, is included in FIG. 4H.

The data from the previous orders placed by the network plurality of users stored in the transactional data store 440 is analyzed the system identifies recommended orders to promote to users. These recommended orders may include a single service type that the system suggests to add to the user's order (eg, suggest an order of beers to be delivered with the pizza), or a bundle of services like the saved order described above. The recommended orders may be suggested to the user throughout their experience, including in the search display 210, cart display 310, and/or tracking display 510. Selecting a recommended order may add the service to the user's cart 310 or may direct them back to the search display 210, where the search may be pre-filtered by the recommendation engine before it is accessed by the user.

An example of an implementation of the concept outlined in FIG. 1 according to one embodiment is illustrated in FIGS. 2 and 3. The various "blocks" refer to related steps across consumers, management systems, providers and partners/supply as shown in FIG. 2 in the four horizontal columns. Mapping of these elements to blocks within FIG. 1 is also included. A "block" may be related actions and associated system modules across all four columns, but are more precisely defined using the specific step numbers as shown in FIG. 2.

Block 100 demonstrates consumers 110 and providers 120 logging in or creating a new account (for new first time users) by entering their login information or completing the new user registration forms. This block illustrates an exemplary embodiment of implementation of block 100 in FIG. 1, with 110 and 120 reflecting the same functions in FIG. 1 and FIG. 2. Applicants note that—"Providers" as understood within the context of this application are distinguished by 3 categories as outlined below and a single provider can be attributed to a single, multiple or all depending on their offerings:

1. 125 Service Providers such as ride share drivers, food/goods/package delivery drivers or any other service providers who own or are in permissible possession of an asset (e.g. car, motor bike, bicycle, scooter, boat, plane etc.) that enables them faster mobility to execute jobs timely and efficiently.
2. 130 Asset owners who wish to list their assets (e.g. car, motor bike, bicycle, scooter, boat, plane, home, women's/men's accessories, books, ball game season tickets, office equipment, furniture, appliances, clothing, loan products, insurance products, warranty products etc.) for short/long term rental or sale. Asset owners can offer bundle deals (e.g. home, car, bicycles and office equipment), which can be very attractive for business and or pleasure use.
3. 135 Asset-less Service Providers are users who wish to offer their personal skills as a service (e.g. Chef, painter, cleaner, home/office designer/decorator, app designer, personal driver, baby sitter, etc.) as well as providers who wish the network to provide them with an asset to execute jobs similar to category "1" service providers; those users are directed to rent the nearest/desired asset from category "2" provider listings prior to becoming available to provide services.

These 3 categories in FIG. 2 represent an example of the Provider registration and classification process 120 in FIG. 1.

For New Users (consumer and provider):
1. All registration data is sent to the User Profile data warehouse 150 (an example of 130 in FIG. 1) for storage and processing; then
2. User identity is verified via social media or txt message confirmation codes using the same phone number on file; then
3. Auto authenticate 160 (an example of 160 in FIG. 1) based on info from step 2 above and send the UserID and GeoID data to the next step (sub process 210) for further processing; then
4. Send Provider/Asset detailed data (e.g. UserID, Provider Category, Service(s) Provided, AssetID, Asset Type, Asset Description, Asset Address, etc.) to the next step (sub process 315) to update the Regional Supply database with new information.

For Existing Users (consumers and Providers):
1. Login credentials (UserID and Password or Finger Print) and GeoID are gathered and sent to user authentication 160, then
2. The data is sent to the user profile data warehouse 150 for matching and verification, then
3. If a match is found and authentication is successful send the UserID and GeoID data to the next step (sub process 210) for further processing, else prompt user to login again and repeat steps 1 through 3 until successful.

Block 200 demonstrates how the management system uses the plurality of consumers and providers' UserID and GeoID data received from the prior process for aggregation and translation processing 210. This is an implementation example of sub-process 205 in FIG. 1.

The aggregator performs a number of activities to prep and process the data received:
1. Distinguishes between and identifies consumers' vs. providers' data,
2. Communicates with the internal storage for users historically translated or provided physical addresses 215 as well as the third party map and GPS provider 220 (e.g. Google or Waze), and
3. Translate the GeoID data to physical addresses to facilitate the next process in the system chain.

The following explains an exemplary communication and processing scenarios for the aggregator 210:

Consumer Data Processing:
1. Query the historical data internal storage 215 using the provided GeoID and UserID combinations to lookup stored associated addresses (captured and stored from previous transactions) and If it finds a match then it sends the UserID, GeoID and Current Address to the next step (sub process 310) for further processing and skips step 2 below; else it moves to step 2 below.
2. Query the third party map and GPS provider 220 using the provided GeoID to translate it to a Physical Address then:
   Stores the UserID, GeoID and Current Address in the internal storage 215 for future use.
   Sends the UserID, GeoID and Current Address to the next step (sub process 310) for further processing.

Provider Data Processing:
1. For mobile providers (e.g. drivers who are constantly on the move)—
   Refresh GeoID from step 160 every 5 seconds to monitor movement, then
   Query the third party map and GPS provider 220 using the provided GeoID to translate it to a Physical Address, then
   Update the UserID, GeoID and Current Address in the regional supply database (sub process 315) for accurate supply positioning.
2. For all other suppliers and assets that are static (e.g. Car listed for rent and its owner)—no need to translate GeoIDs as the static physical addresses are captured during the registration process and stored in the user profile data warehouse 150, which then is sent to update the regional supply database 315.

Block 300 demonstrates how the management system uses the plurality of consumers' UserID, GeoID and Current Address data received from the prior process step to query and identify regional supply (services, assets for rent or sale and providers) availability and unit pricing 310 (example of 220 and 240 in FIG. 1). As it maybe the case that some services, certain kind of assets or providers are not available in some regions at all because for example "regulatory issues", our network and partners' network isn't established in that region yet or simply there is so much demand and not enough supply. This process requires communication with the network's regional supply database 315 and reference pricing data 320 as well as the various partners' supply and pricing databases 330 (each example included in data store 230 in FIG. 1). Obtaining the data from our partners is established via predefined protocols for extraction, transformation and loading that utilize either preconfigured API technology or cloud hybrid integration solutions to gather the data necessary. The query process is designed to be very broad at the first fetch operation where it uses the GeoID and Current Address from sub process 210 to request all available service types, provider proximity (maybe filtered by scoring compatibility with the requesting consumer's score i.e. a 4 rated consumer gets a 4 or 5 rated provider but not a 1, 2 or 3 unless provider availability is an issue in the region at the immediate time) metrics with alignment to each service type, asset for rent or sale metrics by type and unit pricing and loads it into memory or cache on multiple mediums for example in a particular consumer's region based on his or her GeoID and or Current Address (example of sub-process 220 in FIG. 1). The following seems to be available:

1. Services—Ride Share, Gas Up and Valet Parking only
2. Providers:
    a. Ride Share—Type 1 vehicle 2 mins, Type 2 vehicle 4 mins, Type 3 vehicle 1 min, etc.
    b. Gas Up—Partner A 10 mins, Partner B 5 mins, Partner C 30 mins, etc.
    c. Valet Parking—Partner A 40 mins, Partner B 6 mins, etc.
3. Unit Pricing:
    a. Ride Share—Type 1 vehicle $1/min, Type 2 vehicle $1.25/min, Type 3 vehicle $2/min, etc.
    b. Gas Up—Partner A $5 flat+gas, Partner B $7 flat+gas, Partner C $0.5/gallon, etc.
    c. Valet Parking—Partner A $10/hr, Partner B $30/day, Partner C $300/month, etc.
4. Assets for Rent (price included within each listing)—50 cars, 10 SUVs, 3 Boats, 30 Bicycles, and 100 Homes
5. Assets for Sale (price included within each listing)—10 cars, 2 SUVs, 1 Boat and 2 Homes Once all the information is available and loaded it's then displayed for the consumer to navigate through in the next process step (sub process 410).

Block 400 demonstrates how the consumer interacts with the supply and service start location information gathered from the prior process 310. First the consumer is presented with the service start address 410 (example of 210 and 250 in FIG. 1), that was gathered from his or her mobile device location services utility at the login stage 110 If the address displayed is not exact or accurate as to where the services to be requested should start then the consumer can modify the address manually by entering the correct address 415 (example of 255 in FIG. 1).

As the user enters the address in the address search bar the management system will enable his entry to be sent to the third party map and GPS service provider 220 to assist in searching and suggesting matches as he or she progresses in entering the address information thereby providing a dynamic lookup function which enables he or she to make a quicker selection by presenting a drop down of possible matches based on the address information entry progress. Once the consumer makes a selection then it's sent back to the GeoID aggregation and translation processing 210 to trigger a recycle of process steps mentioned in Blocks 200 and 300's description above and then the consumer is presented with refreshed supply and service start location data 410. The consumer then can utilize advanced filtering to navigate through the supply data presented to zone in on services or assets desired. Those filters are passed back as parameters to sub process 310 to rerun the query algorithm and produce a smaller data set from memory or cache resources, then push the result set back to sub process 410 for display. Consumers are able to select as many services, or assets as they desire and add them to their cart 420 (example of 310 in FIG. 1) and checkout once done to submit the full job request. For example if we consider the previous example of available services, providers, assets and unit pricing detailed in Block 300, a consumer may select the following:

1. Rent a car for 1 day at $30/day.
2. Request a Ride Share (Type 1 vehicle) to pickup at the service start address and drop off at the Rental car pick up address.
3. Request Gas Up of $30 Premium with Partner A with no particular time leaving the system to decide.
4. Request Valet with Partner A at a different address where he or she will have dinner later in the day.

Then submit the full job request 420 to the management system which checks whether this is a new job or existing job 425 by checking for a Job Unique Id (JobUID) which is comprised of a random number+the consumer's UserID. The JobUID is the ultimate job request identifier the service management engine relies on throughout the rest of the life cycle of the job request. In this case this job request is a new job request so all request details and the consumer's UserID are sent to next process step (sub process 510) for further processing.

Block 500 demonstrates how the management system uses the job request data gathered from the previous process to create a JobUID, aggregate the services within the request and compiles pricing options. In other words, Block 500 in FIG. 3 is a more detailed and complex illustration of a combination of types-of-services request by a user building upon the earlier example of sub-process 320 in FIG. 1 which the system implements for a single service. In both cases the consumer/user experiences a single checkout experience. Once the full job request data and UserID are received from sub process 425 and determined a JobUID doesn't exist then a unique/random number generator is invoked to produce a number that's then concatenated to the UserID to create the JobUID 510. The JobUID and full job request details are then sent to sub processes 520 through 580 as depicted in detail in FIG. 2 to demonstrate the service aggregation and cost estimation processes (FIG. 2 sub processes 220, 315, 320, 330, 420, 425, 505 and 510 have been previously explained). Once data received then identify all applicable route options for each service leg 520 performing the following steps:

1. Group services by service type to distinguish between:
    a. Services priced based on set transaction or product cost (e.g. Gas Up or Car Rental)
    b. Services priced based on duration or distance (e.g. Ride Share or Delivery)
    c. Services potentially provided by the same provider (e.g. Valet and Gas Up or Ride Share and Food Delivery)
    d. Services provided by separate providers and can't be combined with other service legs within a given job request.
2. For all services requiring provider mobility from point a to point b and priced based on duration or distance, query the third party map or GPS services provider 220 using each service leg's start and end addresses 525. The goal is obtain all route options:
    a. Using different means of travel (e.g. driving, cycling or walking), and b. Depending on traffic conditions the GPS services provider 220 may recommend additional options for each means of travel.

Then send the JobUID, route options and request service details 530 to calculate for each service leg and route option the distance in miles 540, and the duration in minutes 550. Then select Provider/Asset combos 560 for each service leg based on the service type grouping performed earlier in process 520 and with more detail as follows by querying provider/asset data 565 from 315 and 330:

1. The consumer request, where applicable as it maybe specified as part of the service request details.
2. Service type as some services would demand a specific provider/asset combo (e.g. can't match a Gas Up service request with a Ride Share Car and Driver)
3. Route options means of travel, as it won't be appropriate to select a car and driver to serve bicycle navigation route.
4. Provider/asset proximity to the service location.
5. Provider's reputation scoring.

Then send all data from sub processes 540, 550, and 560 to the next process to determine best service legs' execution order for each route option 570. This process uses an algorithm dedicated to logically order the execution of all service legs within a given route option to achieve the shortest time and or distance by deciding the following:

1. Combining applicable services to be executed by the same provider, and or
2. Coordinating individual and non-combinable services' start and end times to make for a seamless handoff.

For example refer to the consumer job request example previously outlined in Block 400 and here what the resulting job request execution order would be:

a. Ride Share (Type 1 vehicle) to pickup at the service start address and drop off at the Rental car pick up address, then
b. Rent a car for 1 day at $30/day, then
c. Valet with Partner A, combined with
d. Gas Up of $10 Premium with Partner A while being valeted.

Then send the JobUID, service request details organized in the execution plan route options for pricing 575. The calculation of the service cost estimates for each execution plan route option 580 queries the network's pricing data internal storage 320 and the Partners' network pricing databases 330 (in the same fashion sub process 310 communicates with the partner databases) using as many as applicable of the following attributes (but not limited to) as query parameters:

1. Service type
2. Provider/asset combos
3. Service duration
4. Service distance
5. Asset listing Id The calculations then take place and at most 2 options are presented to the consumer displaying a cost vs. time advantage (if applicable) for final selection and confirmation 610 (example of 330, 340, and 410 in FIG. 1) and also send the JobUID, execution plan route options and cost estimates to the network's data warehouse for storage and processing 710.

Block 600 (back to FIG. 1) demonstrates how the consumer interacts with the cost estimate options 610 compiled in the previous process by the management system. The consumer can navigate between the presented options' details and decide whether (example of 440 in FIG. 1):

1. Accept an Option—which sends JobUID and option identifier to the next process step (sub process 710) for further processing,
2. Deny all Options—which sends the JobUID to the next process step (sub process 710) for cancelation notification and directs the consumer to sub process 410 where they can compile a new job service order, Or
3. Modify Service Request—which sends the JobUID to sub process 420 where the consumer can view their original job order request within their cart to preform any modifications needed such as add new services and remove or update existing ones then submit the updated request to sub process 425 where the management system makes a determination that a JobUID exists and sends the JobUID and updated job request details to sub processes 520-580 for processing as outlined above in previous sections.

Block 700 demonstrates how the management system collects job request data from previous processes for storage and processing 710 to perform a multitude of operations (example of 420 and 430 in FIG. 1):

1. Handle services' execution order and scheduling dependencies.
2. Dispatch appropriate message, notifications or actual job orders to network and partner providers' queues (sub process 810-845),
3. Initiate navigation instructions guidance and tracking for consumers and providers (sub processes 910-945),
4. Request and receive final total trip cost and process payment debits and credits (sub processes 970-990)

In step 1 in the process of how the management system collects job request data, the JobUID and job request details and service leg execution schedules are logged, monitored and flagged for step 2 (dispatching to partners and provider). Progress data of ongoing service legs is gathered real time from sub process 960 to help affirm when dependencies are clear for the next service leg to be dispatched to step 2.

In step 2 in the process of how the management system collects job request data, the JobUID and job request details are dispatched accordingly based on the service type and whether the provider is a network provider or partner affiliate. The following depicts how dispatching and notification is handled for each service leg:

a. If services are provided by a network provider of category 125 or 135 then place the service request details in the dynamic demand queue 810, else
b. If services are provided by a network provider of category 130 then dispatch a notification to the provider's device advising asset status change 820 (rented or sold), display consumers info and any further instructions as applicable, else
c. If services are provided by a partner service provider and are self-service in nature (e.g. renting a parking spot) then send the partner a notification advising the asset status change 830, display consumer info and any further instructions as applicable, else
d. Send service request details to the partner's designated service demand queue 840.

In step 3 in the process of how the management system collects job request data, the JobUID, job request details, provider UserID (after receipt from sub process 815) and PartnerID (after receipt from sub process 845) are sent to the next process step (sub process 910) for further processing. In step 4 the JobUID, job request details, consumer UserID (parsed from the JobUID) and account #, provider UserID and account #, PartnerID and account number are sent to the next process step (sub process 970) for further processing.

Block 800 demonstrates how the network providers and partners interact with the management system dispatch engine. This represents an example of the reservation and ordering system 450 in FIG. 1, broken out into separate process for Network Providers and Partners here in FIG. 2. Network providers who are in category 125 and or 135 all have access to a dynamic service demand queue 810 that the management engine utilizes to dispatch services requested by consumers. The queue displays services organized by service type and proximity, and filters by provider/asset type combo and provider's reputation scoring. Once a provider selects and accepts a job 815 then the provider UserID and JobUID are sent back to sub process 710 for confirmation and further processing. Network providers who are in category 130 receive notifications of their listed assets status change 820. They are informed that a consumer has either rented or bought an asset they have listed. Separately they receive an email with the consumer's detailed information and transaction cost details. Partners who provide services that are self-service in nature (e.g. parking spot for rent) receive notifications of their listed assets status change 830. They are informed that a consumer has either rented or bought an asset they have listed. Separately they receive an email with the consumer's detailed information and transaction cost details. Partner service providers who are in similar categories to the network providers' (categories 125 or 135) receive the job request details in their partner designated service demand queues 840 (configuration of these queues are a function of each partner's platform and not dictated by the service management engine). Once a partner service provider selects and accepts a job 845 then their parnterID and JobUID are sent to sub process 710 for further processing.

Block 910-960 demonstrates how the management system receives its job request data after confirmation of consumer need and provider availability to execute a service to then distribute each user's information to the other party as well as handing out navigation instructions and tracking capabilities to guide the Job requested through completion 910. This represents a detailed example of the order tracking sub process 500 in FIG. 1. Sub process 910 receives its first set of data from sub process 710 including JobUID, job request details, provider UserId (after receipt from sub process 815) and PartnerID (after receipt from sub process 845). Then communicates with the third party map and GPS services provider 220, the partners' navigation guidance instructions sent by the partner to their provider to guide him or her through the job 915, the network's user profile data warehouse 150 and the partners' user profile databases 330 to gather navigation instructions and consumer/provider user information which are then distributed to the various users involved with a service in progress. Those communication details are as follows:
1. Query 220 using the service's start and end addresses (obtained from prior process steps) as query parameters to receive the detailed step-by-step navigation instructions for guidance and tracking purposes.
2. Query 915 using the JobUID, partnerID and services start and end addresses (as necessary) as query parameters to receive the detailed step-by-step navigation instructions.
3. Query 150 using the consumer or the network provider UserIds as query parameters to obtain the detailed user information such as (but not limited to) full name, phone number, picture and asset description.
4. Query 330 using the partnerID as a query parameter to obtain same details like the previous step Then once all data has been collected the providers receive the navigational instructions from start to end points of each service leg as well as the consumer's name and contact information 920. For select services (e.g. Ride Share) the provider might be equipped with a dash cam, which will capture a real time video stream of the street view from the provider's car 930 that is then sent to the management system's visual data feed warehouse and broadcaster 935. The feed is enhanced by overlaying the navigation instructions from sub step 910, which are being sent to the driver in real time for guidance. The consumer then receives navigation and provider information 940 (example of 510 in FIG. 1) as follows:
1. For "self service" services (e.g. self parking) the consumer will receive navigation instructions to guide him or her to the parking lot facility.
2. For services provided by a network provider or a partner service provider the consumer will receive:
    a. The provider's name, picture, Asset description and contact information.
    b. Navigation tracking information to monitor service progress and provider location. In cases where the network provider is dash cam equipped, the consumer receives the enhanced dash cam feed broadcasted from sub process 935.
    c. Count down in minutes and miles to service completion.

In some situations a consumer may decide to cancel a service that is in progress (e.g. cancel a food delivery, cancel a ride share pickup, etc.) those cancelation commands are first initiated by the consumer in sub process 945, which sends the JobUID and a cancelation notification to the next process step (sub process 950) to log the cancellation request. All parties involved in an on-going transaction must transmit real time transaction progress data via their local devices 950 back to the management engine for temporary storage and processing 960. The data transmitted includes (but not limited to) JobUID, account numbers, changes in execution plan route option, changes in service duration or distance for example due to additional stops, service cancelations and service completion. Once the temporary real time storage and processing 960 gather all data it is then sent to the data warehouse 710 for final processing (update Job request and execution details as necessary) and logging. Then the data warehouse initiates the final pricing calculation by sending JobUID, job request details, consumer UserID (parsed from the JobUID) and account #, provider UserID and account #, PartnerID and account number to the next process step (sub process 970) for further processing.

Block 970-990 demonstrates how the payment processing and consumer/provider/partner scoring is handled. This step is contemplated within step 430 in FIG. 1. As sub process 970 receives all data necessary to calculate the final job cost it calculates the final cost for each service leg within the job request, then it groups debit/credit amounts and account numbers associated with each debit and credit for each service leg and sends the instructions to the third party payment processor (e.g. Paypal) 980 for final processing. For instance, where a job is canceled by a consumer prior to completion, the process checks whether the time elapsed breaches the system thresholds and whether a cancelation charge should be assessed. The third party payment processor then collects the debits and distributes the credits accordingly 990. Consumers are then prompted to score their providers based on their experience and vice versa.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A system for connecting consumers with services, said system comprising:
   a mobile application management platform for supporting connection with a plurality of third party service providers each of which providing a service through a corresponding mobile application platform,
   said mobile application management platform including a display module for providing an interface for displaying interaction with said third party service providers in an integrated arrangement, said interactive display configured to be viewed on an electronic device of a consumer, allowing said consumer to select and order a plurality of selectable services offered by said third party service providers without interacting directly with said third party mobile application platforms;
   said display module configured to receive from said consumer a request for at least two services offered by a plurality of said mobile application platforms of said third party service providers, said request transmitted to said system;
   a database aggregation unit configured to receive and store data from a plurality of third party service provider databases each of said third party service provider databases contain data sufficient to perform services for a corresponding third party mobile application platform;
   a processor configured to parse said service request for at least said two services from said consumer based on data stored in said database aggregation unit, said processor assembling at least one combination of at least said two services, based on a coordination of an optimized combination of said two services based on time and cost so as to allow said consumer to select and initiate a corresponding request for said combination to at least said two services;
   a scheduling unit configured to monitor the time of completion of each one of said selected services; and
   a fulfillment module configured to complete ordering of the transaction with both said consumer, said fulfillment module sending service request to said third party service providers, based on information received from said scheduling unit regarding the completion time of each service while each service is being performed.

* * * * *